US012744320B2

(12) United States Patent
Wang et al.

(10) Patent No.: US 12,744,320 B2
(45) Date of Patent: Sep. 22, 2026

(54) OPEN LOOP ANTENNA AND ELECTRONIC DEVICE

(71) Applicant: Wistron NeWeb Corporation, Hsinchu (TW)

(72) Inventors: Hao-Yu Wang, Hsinchu (TW); Pei Siou Luo, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 291 days.

(21) Appl. No.: 18/151,499

(22) Filed: Jan. 9, 2023

(65) Prior Publication Data

US 2024/0063543 A1 Feb. 22, 2024

(30) Foreign Application Priority Data

Aug. 17, 2022 (TW) ................................ 111131016

(51) Int. Cl.
*H01Q 7/00* (2006.01)
*H01Q 5/35* (2015.01)
(Continued)

(52) U.S. Cl.
CPC ................ *H01Q 7/00* (2013.01); *H01Q 5/35* (2015.01)

(58) Field of Classification Search
CPC .......... H01Q 7/00; H01Q 5/407; H01Q 9/26; H01Q 9/42; H01Q 5/307; H01Q 5/35; H01Q 5/378; H01Q 5/371; H01Q 5/40; H01Q 1/48; H01Q 1/243; H01Q 1/38; H01Q 5/328
See application file for complete search history.

(56) References Cited

U.S. PATENT DOCUMENTS

| | | | | |
|---|---|---|---|---|
| 11,239,550 B2 * | 2/2022 | Cooper | .................. | H01Q 1/526 |
| 2015/0180118 A1 * | 6/2015 | Huang | .................. | H01Q 1/521 343/841 |
| 2018/0277951 A1 * | 9/2018 | Nishikawa | ............... | H01Q 9/42 |

FOREIGN PATENT DOCUMENTS

| | | |
|---|---|---|
| TW | 201140939 A | 11/2011 |
| TW | 201729461 A * | 8/2017 |

OTHER PUBLICATIONS

TW 201729461 Translation (Year: 2017).*
TW-201729461-A (Year: 2017).*
TW-201729461-A Translation (Year: 2017).*

* cited by examiner

*Primary Examiner* — Dameon E Levi
*Assistant Examiner* — Gurbir Singh
(74) *Attorney, Agent, or Firm* — McClure, Qualey & Rodack, LLP

(57) ABSTRACT

An open loop antenna includes a base, a first radiating section disposed on the base, a second radiating section spaced apart from the first radiating section to form an open loop, and a grounding section spaced apart from the first radiating section and connected to the second radiating section and a ground voltage. The first radiating section includes a feeding segment connected to a feeding point, an extending segment connected to the feeding segment and excited to generate a first frequency band, and a high-frequency coupling segment connected to the extending segment and excited to generate a second frequency band. The second radiating section is coupled with the first radiating section to generate a third frequency band. The first frequency band is higher than the second frequency band. The second frequency band is higher than the third frequency band.

19 Claims, 8 Drawing Sheets

(51) Int. Cl.

| | |
|---|---|
| *H01Q 5/371* | (2015.01) |
| *H01Q 5/378* | (2015.01) |
| *H01Q 9/42* | (2006.01) |

OPEN LOOP ANTENNA AND ELECTRONIC DEVICE

RELATED PATENT APPLICATION

This application claims the benefit of priority to Taiwan Patent Application No. 111131016, filed on Aug. 17, 2022. The entire content of the above identified application is incorporated herein by reference.

BACKGROUND

Technical Field

The present disclosure relates to antenna technology field, and more particularly, to an open loop antenna and an electronic device having the open loop antenna.

Description of Related Art

With the rapid development of wireless communication technology, mobile communication devices like notebook computers, tablet computers, and cellular phones are trending toward thin-and-light. Under the miniaturization trend, hardware space in the mobile communication device is severely compressed, and so the space allocated for antenna is also relatively limited. Many electronic modules and electric components are arranged in close proximity to the antenna, thereby causing interference which affects antenna characteristics and radiation efficiency.

From this, how to arrange antenna inside limited space of mobile communication device housing while maintaining high radiation efficiency and reducing noise interference from surrounding electronic modules and electric components is a goal in the related industry.

SUMMARY

It is an aspect of the present disclosure to provide an open loop antenna that includes a base, a first radiating section, a second radiating section, and a grounding section. The first radiating section is disposed on one side of the base and includes a feeding segment, an extending segment, and a high-frequency coupling segment. One end of the feeing segment is connected to a feeding point. The extending segment is connected to another end of the feeding segment and generates a first frequency band when being excited. The high-frequency coupling segment is connected to the extending segment and generates a second frequency band when being excited. The second radiating section is disposed on the base and spaced apart from the first radiating section to form an open loop. The second radiating section is coupled with the first radiating section to generate a third frequency band. The first frequency band is higher than the second frequency band, and the second frequency band is higher than the third frequency band. The grounding section is disposed on the base and spaced apart from the first radiating section. The grounding section is connected to the second radiating section and a ground voltage.

It is another aspect of the present disclosure to provide an electronic device that includes a housing, an open loop antenna, and at least one electronic module. The open loop antenna is disposed in the housing and includes a base, a first radiating section, a second radiating section, a grounding section, a coaxial cable, and a shielding member. The base has at least one surface. The first radiating section is disposed on one side of the base and includes a feeding segment, an extending segment, and a high-frequency coupling segment. One end of the feeding segment is connected to a feeding point. The extending segment is connected to another end of the feeding segment and generates a first frequency band when being excited. The high-frequency coupling segment is connected to the extending segment and generates a second frequency band when being excited. The second radiating section is disposed on the side of the base and spaced apart from the first radiating section to form an open loop. The second radiating section is coupled with the first radiating section to generate a third frequency band. The first frequency band is higher than the second frequency band, and the second frequency band is higher than the third frequency band. The grounding section is disposed on the side of the base and spaced apart from the first radiating section. The grounding section is connected to the second radiating section and a ground voltage. The coaxial cable is disposed on the base and includes a central conductive line and a conductive housing. The central conductive line is coupled to the feeding point, and the conductive housing is coupled to a grounding point of the ground voltage. The shielding member is coupled to the ground voltage and covers the at least one surface of the base. The shielding member surrounds the first radiating section and the second radiating section to provide electromagnetic shielding for the first radiating section and the second radiating section. The at least one electronic module is disposed in the housing and around the open loop antenna.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
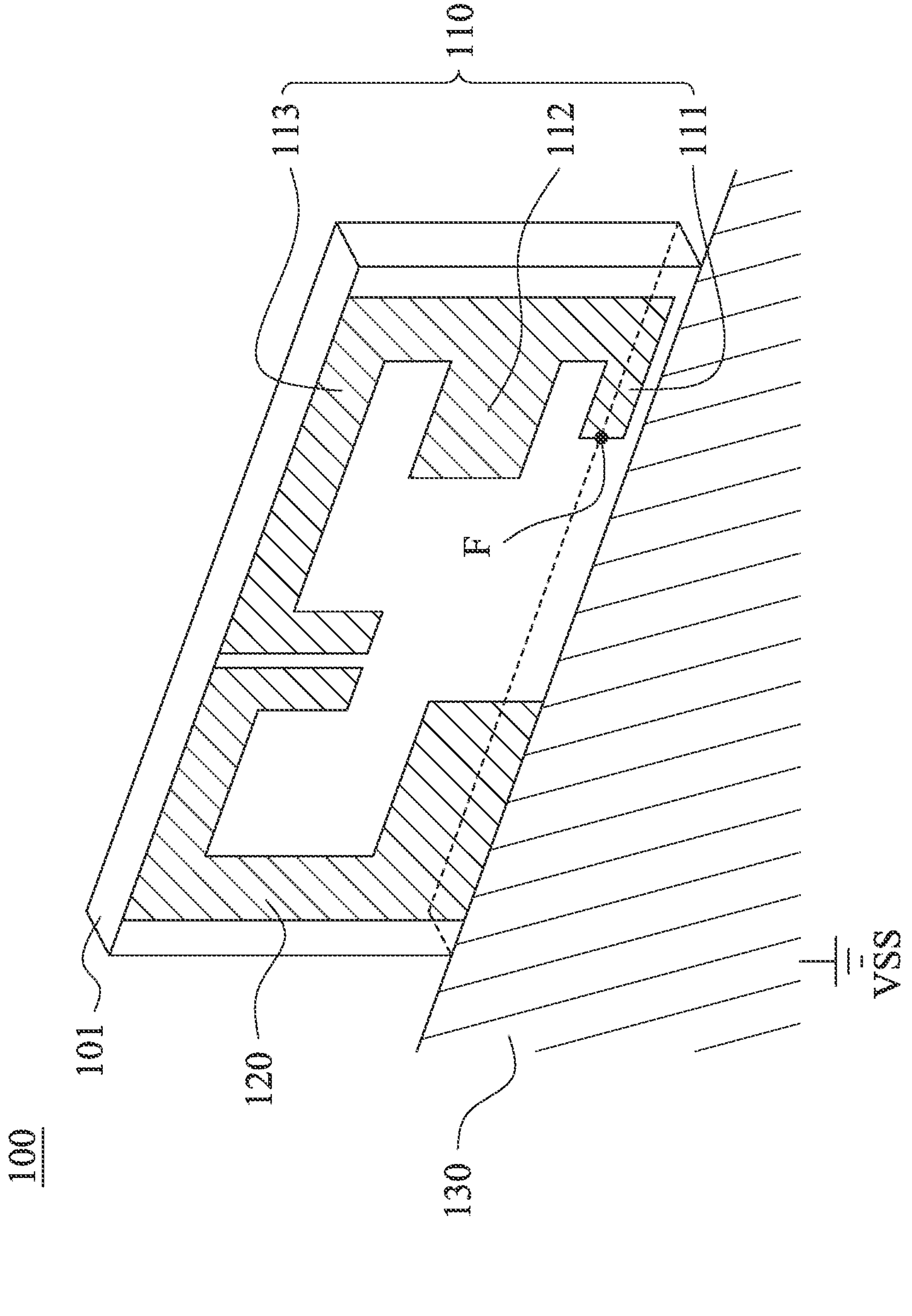
FIG. 1 is a schematic view of an open loop antenna according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms, such as "first", "second" or "third" can be used to describe various components, signals or the like, which are for distinguishing one component/signal from another one only, and are not intended to, nor should be construed to impose any substantive limitations on the components, signals or the like.

In the present disclosure, when an element (i.e., a unit or a module) is described to "connect" to another element, it means to that the element is directly connected to the other element, or that certain element is indirectly connected to the other element, which implies that there is another element between the element and the other element. When an element is described to "directly connect" to another element, it means to no other element is between the element and the other element.

Referring to FIG. 1, an open loop antenna 100 according to a first embodiment of the present disclosure includes a base 101, a first radiating section 110, a second radiating section 120, and a grounding section 130. The base 101 can be a planar substrate, such as a system main board, a printed circuit board (PCB), a flame retardant 4 (FR4) substrate, or a flexible printed circuit board (FPCB), of a communication equipment or electronic device. The first radiating section 110, the second radiating section 120, and the grounding section 130 are disposed on the base 101, and the first radiating section 110 includes a feeding segment 111, an extending segment 112, and a high-frequency coupling segment 113. One end of the feeding segment 111 is connected to a feeding point F. The extending segment 112 is connected to the other end of the feeding segment 111, and can be excited to generate a first frequency band. The high-frequency coupling segment 113 is connected to the extending segment 112 and can be excited to generate a second frequency band. The second radiating section 120 and the first radiating section 110 are spaced apart and form an open loop. The second radiating section 120 can be coupled with the first radiating section 110 to generate a third frequency band. The first frequency band is higher than the second frequency band, and the second frequency band is higher than the third frequency band. The grounding section 130 is spaced apart from the first radiating section 110 and connected to the second radiating section 120. The grounding section 130 is coupled to a ground voltage VSS, and the ground voltage VSS can be provided by a system ground plane (not shown) of the open loop antenna 100. Thus, the open loop antenna 100 of the present disclosure is able to excite various frequency bands through the arrangement among the first radiating section 110, the second radiating section 120, and the grounding section 130.

Figure 2:
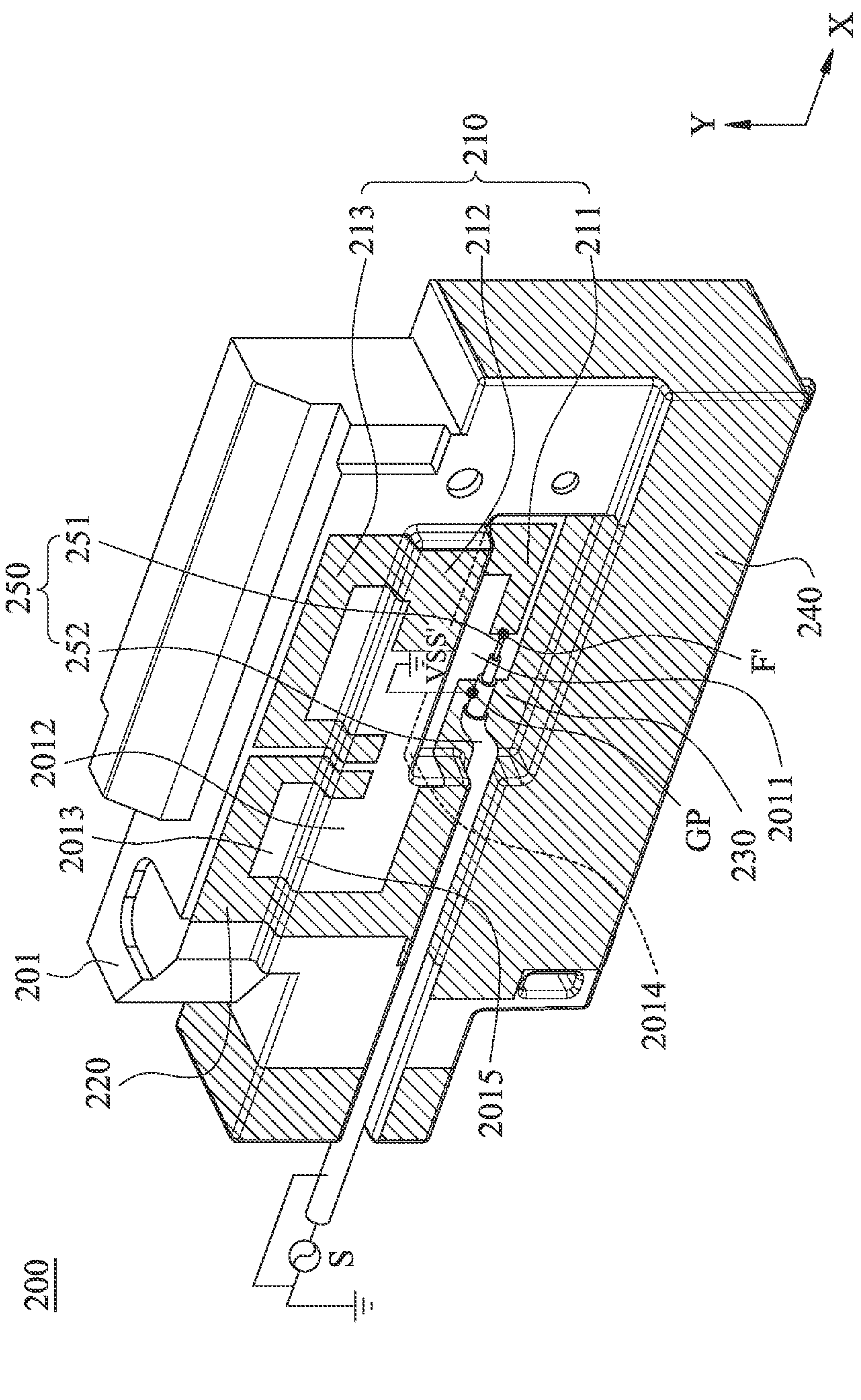
FIG. 2 is a schematic view of an open loop antenna according to a second embodiment of the present disclosure.

Referring to FIG. 2, an open loop antenna 200 according to a second embodiment of the present disclosure includes a base 201, a first radiating section 210, a second radiating section 220, and a grounding section 230. The first radiating section 210, the second radiating section 220, and the grounding section 230 are disposed on the same side of the base 201 and made of metal material, such as copper, silver, aluminum, iron, or alloy of the aforementioned metals. In addition, the first radiating section 210, the second radiating section 220, and the grounding section 230 can be electroplated and/or 3D printed on the base 201.

The first radiating section 210 includes a feeding segment 211, an extending segment 212, and a high-frequency coupling segment 213. One end of the feeding segment 211 is connected to a feeding point F' that can be coupled to a signal source S like a radio frequency (RF) module, and the signal source S is used to excite the open loop antenna 200. The extending segment 212 is connected to the other end of the feeding segment 211 and generates a first frequency band when being excited. The high-frequency coupling segment 213 is connected to the extending segment 212 and generates a second frequency band when being excited. The second radiating section 220 and the first radiating section 210 are spaced apart and form an open loop. The second radiating section 220 is coupled with the first radiating section 210 to generate a third frequency band. The first frequency band is higher than the second frequency band, and the second frequency band is higher than the third frequency band. The grounding section 230 and the first radiating section 210 are spaced apart, and the grounding section 230 is connected to the second radiating section 220 and coupled to a ground voltage VSS'.

Figure 3:
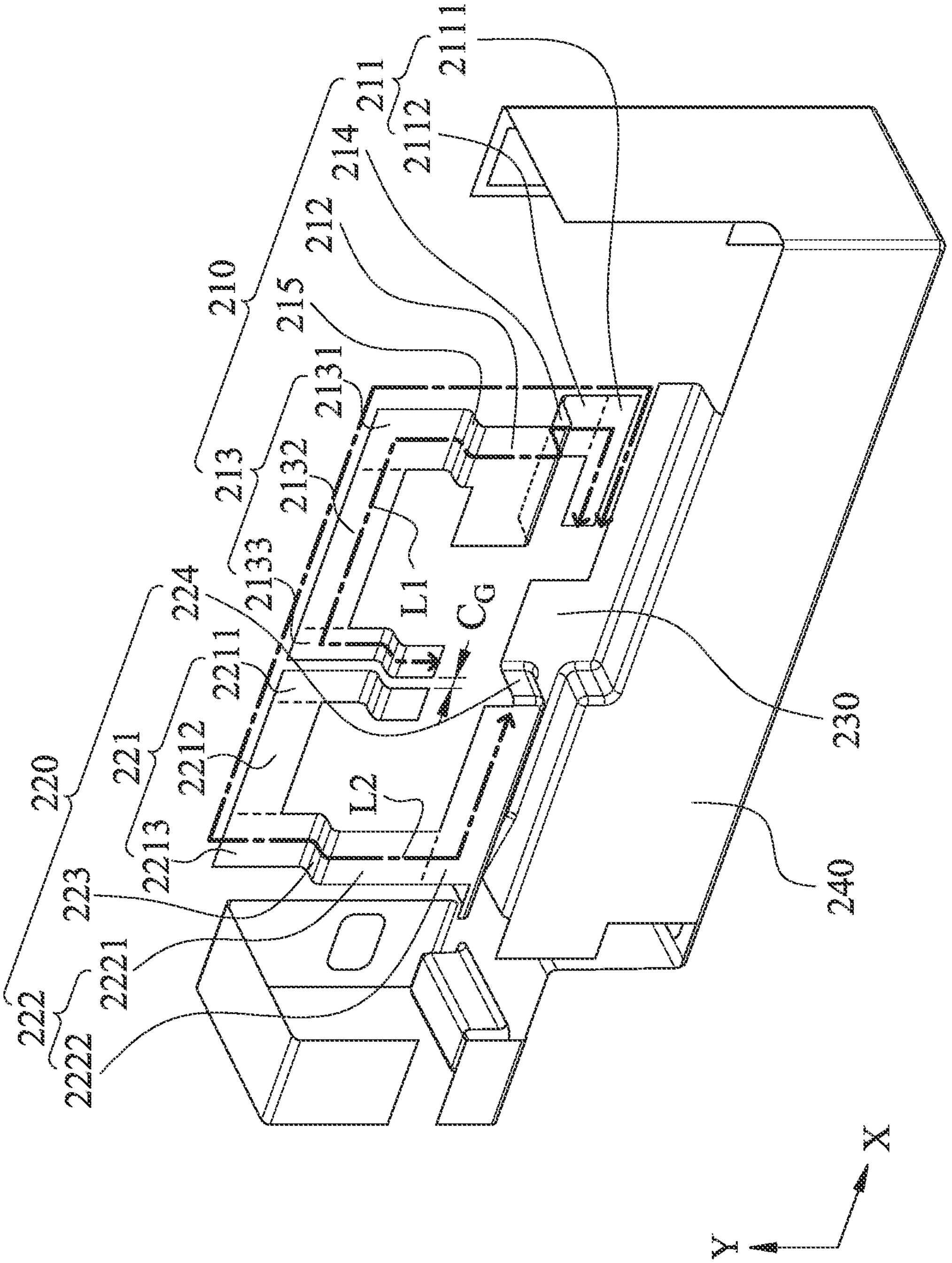
FIG. 3 is a schematic view illustrating a first radiating section, a second radiating section, a grounding section, and a shielding member of the open loop antenna shown in FIG. 2.

The difference between the first embodiment and the second embodiment is that the base 201 of the second embodiment as a whole is an irregular three dimensional structure with a plurality of surfaces. The open loop antenna 200 further includes a shielding member 240, and the shielding member 240 is a metal frame (as shown in FIG. 3) that is formed in correspondence to some of the surfaces of the base 201. The shielding member 240 covers some of the surfaces of the base 201 and is connected to the grounding section 230 and coupled to the ground voltage VSS'. Especially, the shielding member 240 surrounds the first radiating section 210 and the second radiating section 220 for providing electromagnetic shielding. Hence, through the shielding member 240, the open loop antenna 200 of the present disclosure is able to isolate the electromagnetic waves generated by other electronic modules or electric components near the open loop antenna 200, such that the first radiating section 210, which operates in the first frequency band and the second frequency band, and the second radiating section 220, which operates in the third frequency band, are not interfered by noise, and thereby enhancing the stability and the radiation efficiency of the open loop antenna 200.

Moreover, the open loop antenna 200 further includes a coaxial cable 250. The coaxial cable 250 is disposed in an accommodating slot (unlabeled) of the base 201 and includes a central conductive line 251 and a conductive housing 252. The central conductive line 251 is coupled to the feeding point F', and the conductive housing 252 is coupled to a grounding point GP of the ground voltage VSS'. In specific, a positive electrode of the signal source S can be coupled to the central conductive line 251 and a negative electrode of the signal source S can be coupled to the conductive housing 252 to excite the open loop antenna 200.

The structural details of the first radiating section 210 and the second radiating section 220 are described below.

Referring to FIG. 2 and FIG. 3, the surfaces of the base 201 includes a first surface 2011, a second surface 2012, a third surface 2013, a fourth surface 2014 connecting the first surface 2011 and the second surface 2012, and a fifth surface 2015 connecting the second surface 2012 and the third surface 2013. The first surface 2011, the second surface 2012, and the third surface 2013 are parallel to one another. As shown in FIG. 3, the first radiating section 210 further includes a first connecting segment 214 and a second connecting segment 215. The first connecting segment 214 is disposed on the fourth surface 2014 and connects between the feeding segment 211 and the extending segment 212. The second connecting segment 215 is disposed on the fifth surface 2015 and connects between the extending segment 212 and the high-frequency coupling segment 213.

The feeding segment 211 is disposed on the first surface 2011 and includes a first feeding subsection 2111 and a second feeding subsection 2112. The first feeding subsection 2111 is configured to extend from the feeding point F' along a first direction (positive X direction). The second feeding subsection 2112 is configured to extend from the first feeding subsection 2111 along a second direction (positive Y direction), and the second direction is perpendicular to the first direction, such that the first feeding subsection 2111 and the second feeding subsection 2112 form a L shape. The extending segment 212 is of a rectangular shape and is configured to extend toward the second radiating section 220 on the second surface 2012.

The high-frequency coupling segment 213 includes a first high-frequency coupling subsection 2131, a second high-frequency coupling subsection 2132, and a third high-frequency coupling subsection 2133. The first high-frequency coupling subsection 2131 is configured to extend from the second connecting segment 215, which is connected to the extending segment 212, along the second direction on the third surface 2013. The second high-frequency coupling subsection 2132 is configured to extend from the first high-frequency coupling subsection 2131 along a third direction (negative X direction) on the third surface 2013, and the third direction is opposite the first direction. The third high-frequency coupling subsection 2133 is configured to extend from the second high-frequency coupling subsection 2132 along a fourth direction (negative Y direction), and the fourth direction is opposite the second direction. In addition, the third high-frequency coupling subsection 2133 includes three segments (unlabeled) respectively disposed on the third surface 2013, the fifth surface 2015, and the second surface 2012. On the third surface 2013, the first high-frequency coupling subsection 2131, the second high-frequency coupling subsection 2132, and one of the three segments of the third high-frequency coupling subsection 2133 are connected to form a U shape.

The second radiating section 220 includes a low-frequency coupling segment 221 and a grounding segment 222. The low-frequency coupling segment 221 is configured to be spaced apart from the high-frequency coupling segment 213 along the third direction. The grounding segment 222 is configured to extend from the low-frequency coupling segment 221 along the fourth direction. In particular, the low-frequency coupling segment 221 includes a first low-frequency coupling subsection 2211, a second low-frequency coupling subsection 2212, and a third low-frequency coupling subsection 2213. The first low-frequency coupling subsection 2211 is configured to be spaced apart from the third high-frequency coupling subsection 2133 of the high-frequency coupling segment 213 along the third direction. In addition, the first low-frequency coupling subsection 2211 includes three segments (unlabeled) respectively disposed on the second surface 2012, the fifth surface 2015, and the third surface 2013. The three segments of the first low-frequency coupling subsection 2211 are respectively parallel to the three segments of the third high-frequency coupling subsection 2133. The second low-frequency coupling subsection 2212 is configured to extend from the first low-frequency coupling subsection 2211 along the third direction on the third surface 2013. The third low-frequency coupling subsection 2213 is disposed on the third surface 2013 and configured to extend from the second low-frequency coupling subsection 2212 along the fourth direction. On the third surface 2013, one of the segments of the first low-frequency coupling subsection 2211, the second low-frequency coupling subsection 2212, and the third low-frequency coupling subsection 2213 are connected to form another U shape.

As shown in FIG. 3, the second radiating section 220 further includes a third connecting segment 223 and a fourth connecting segment 224. The third connecting segment 223 is disposed on the fifth surface 2015 and connects between the low-frequency coupling segment 221 and the grounding segment 222. The fourth connecting segment 224 is disposed on the fourth surface 2014 and connects between the grounding segment 222 and the grounding section 230. More particularly, the grounding segment 222 is disposed on the second surface 2012 and includes a first grounding subsection 2221 and a second grounding subsection 2222. The first grounding subsection 2221 is configured to extend from the third connecting segment 223, which is connected to the third low-frequency coupling subsection 2213, along the fourth direction. The second grounding subsection 2222 is configured to extend from the first grounding subsection 2221 along the first direction. The first direction is perpendicular to the fourth direction, and so the first grounding subsection 2221 and the second grounding subsection 2222 form another L shape. The second grounding subsection 2222 is indirectly connected to the grounding section 230 through the fourth connecting segment 224.

The operating frequency band and size of the open loop antenna 200 according to the second embodiment is described below. The first frequency band is between 5925 MHz and 7125 MHz. The second frequency band is between 5150 MHz and 5850 MHz. The third frequency band is between 2400 MHz and 2500 MHz. Hence, the open loop antenna 200 supports the operating frequency bands required by WIFI 6E standard. The first radiating section 210 has a length L1 that is one quarter of a wavelength (λ/4) of the second frequency band. By configuring the length L1 of the first radiating section 210, the present disclosure is able to adjust the offset of the open loop antenna 200 operating in high frequency band (i.e., the first frequency band and the second frequency band). It is to be noted that a coupling gap $C_G$ is formed between the first radiating section 210 and the second radiating section 220, and the coupling gap $C_G$ is between 0.3 mm to 1 mm. The present disclosure is able to adjust the matching of the open loop antenna 200 operating in the third frequency band through arranging the coupling gap $C_G$, and the coupling gap $C_G$ is preferably 0.5 mm. Furthermore, the first radiating section 210, the coupling gap $C_G$, and the second radiating section 220 have a total length L2, and the total length L2 is one half of a wavelength (λ/2) of the third frequency band. The present disclosure is not limited thereby.

Figure 4:
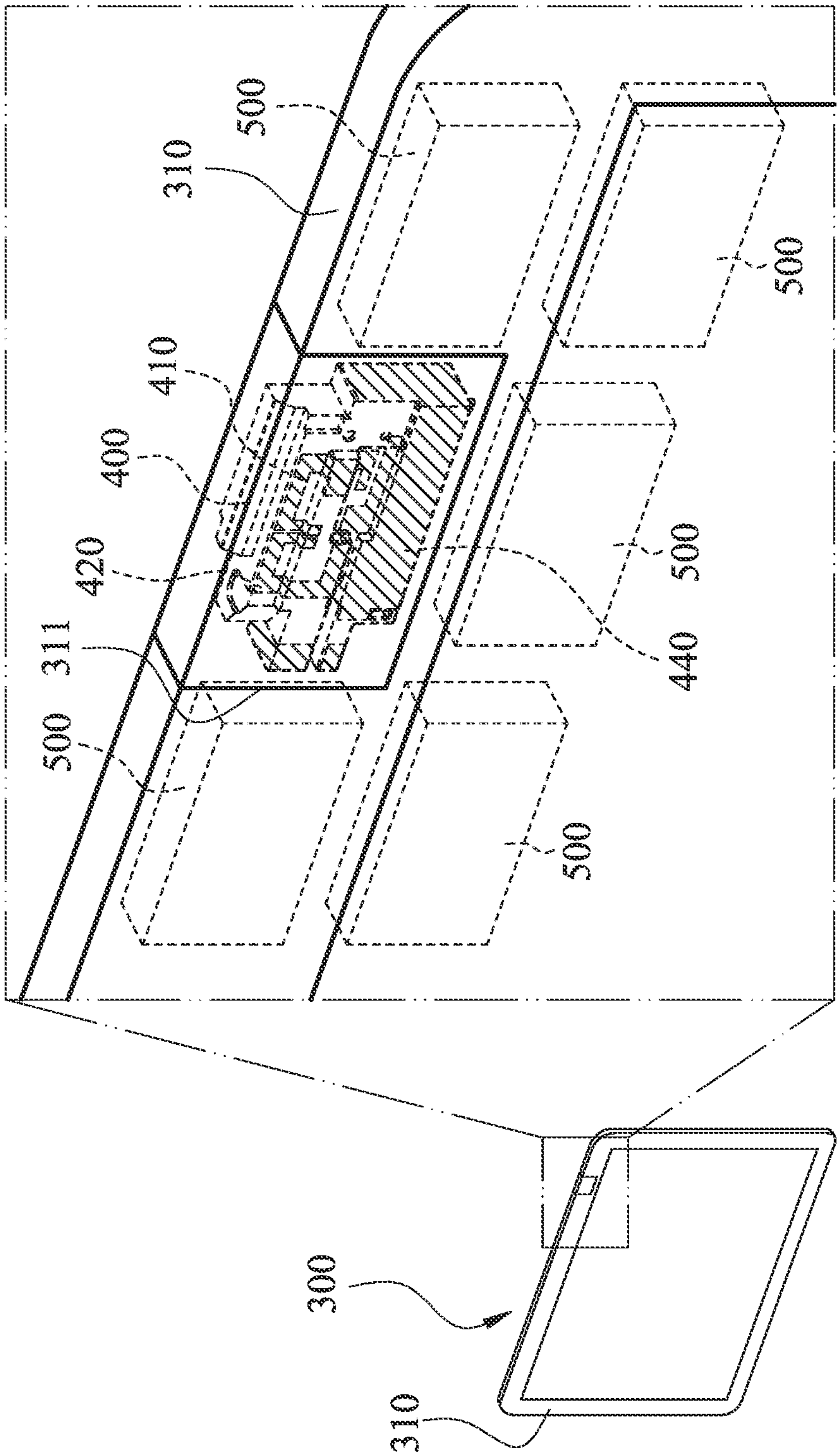
FIG. 4 is a schematic view of an electronic device according to a third embodiment of the present disclosure.

Referring to FIG. 4, an electronic device 300 according to a third embodiment of the present disclosure can be a mobile communication device, such as a smart phone, a tablet computer, or a notebook computer. The electronic device 300 includes a housing 310, an open loop antenna 400, and at least one electronic module 500. The open loop antenna 400 in the third embodiment is similar to the open loop antenna 200 in the second embodiment, and therefore the corresponding elements and configurations will not be described herein. The housing 310 is a metal component with an antenna window 311. The open loop antenna 400 is disposed in the housing 310, and the first radiating section 410 and the second radiating section 420 of the open loop antenna 400 are aligned with the antenna window 311. The internal of the antenna window 311 can be filled/layered with non-conductive material to avoid interference caused by the metallic portion of the housing 310 to the radiation pattern of the open loop antenna 400. Furthermore, there could be a plurality of electronic modules 500, and these electronic modules 500 are disposed in the housing and around/surround the open loop antenna 400. The shielding member 440 of the open loop antenna 400 surrounds the first radiating section 410 and the second radiating section 420 so as to provide electromagnetic shielding for the first radiating section 410 and the second radiating section 420. Thus, through the shielding member 440, the open loop antenna 400 of the present disclosure is able to isolate the electromagnetic waves generated by the electronic modules 500 around the open loop antenna 400 in the electronic device 300, so that the first radiating section 410, which operates in the first frequency band and the second frequency band, and the second radiating section 420, which operates in the third frequency band, are not affected by noise interference. As such, the stability and the radiation efficiency of the open loop antenna 400 are thereby improved.

Figure 5A:
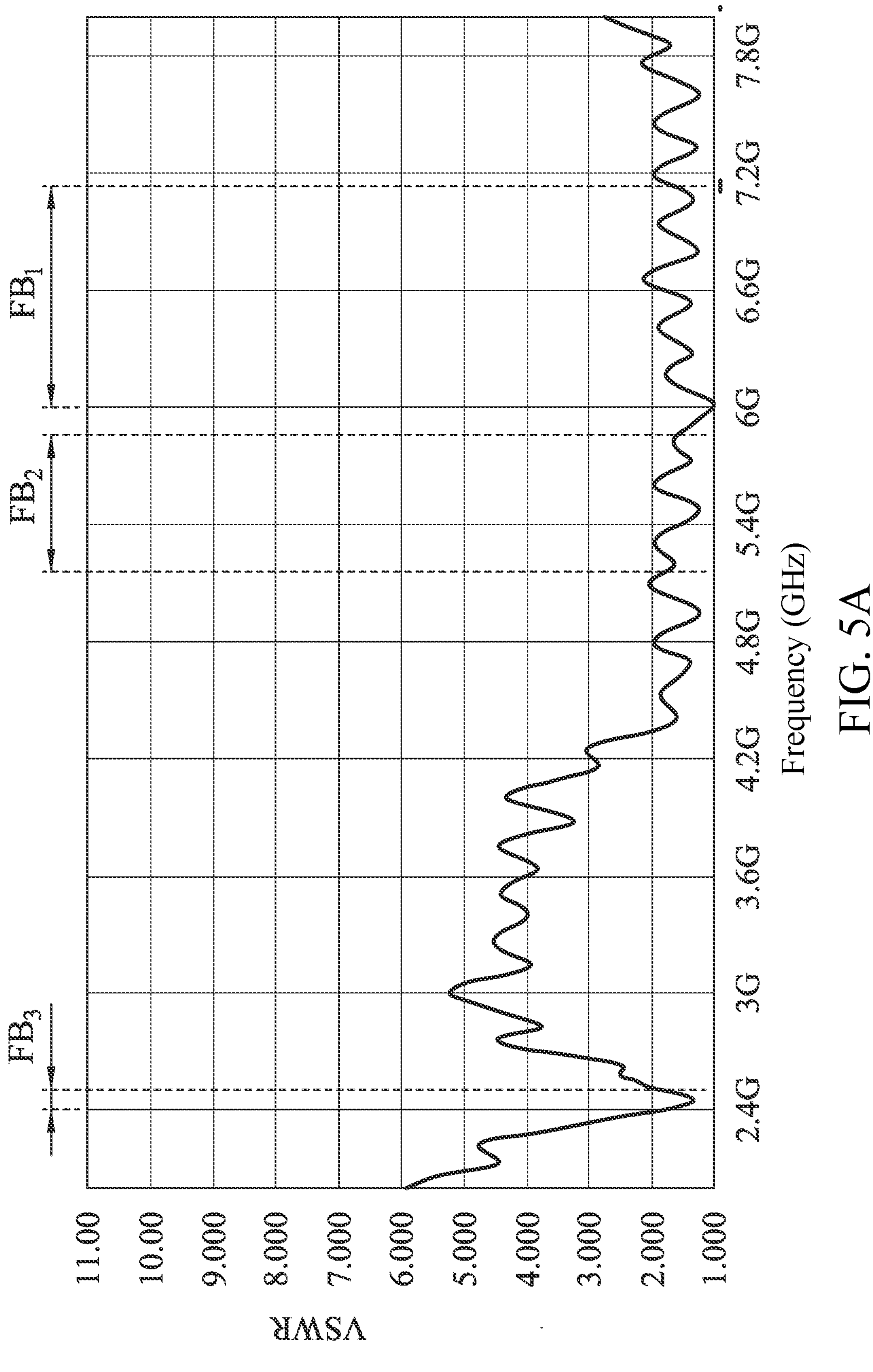
FIG. 5A is a voltage standing wave ratio (VSWR) graph of the open loop antenna in the electronic device shown in FIG. 4.
Figure 5B:
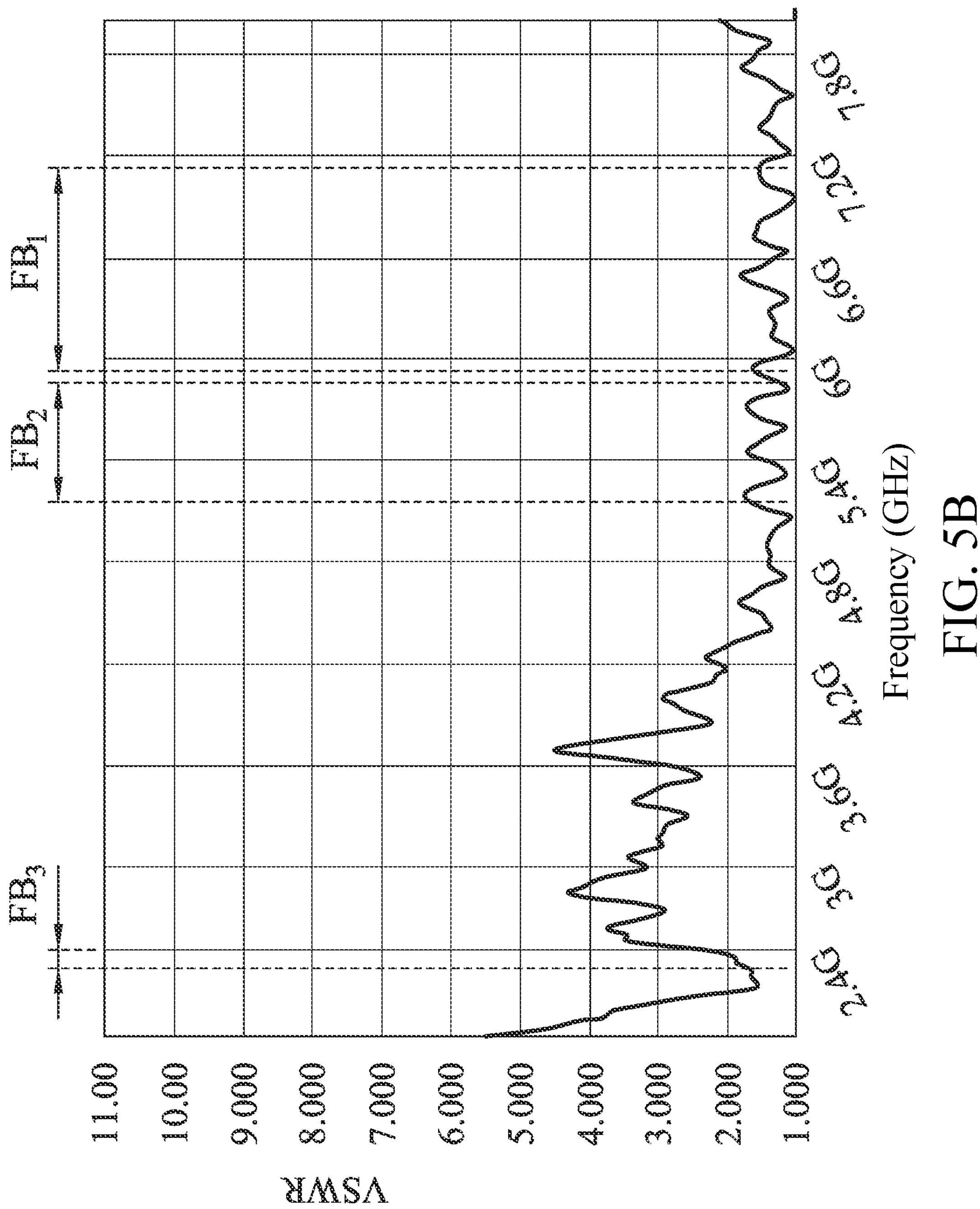
FIG. 5B is a voltage standing wave ratio (VSWR) graph of an open loop antenna without a shielding member.

Referring to FIG. 5A and FIG. 5B, which respectively illustrate a voltage standing wave ratio (VSWR) graph of the open loop antenna 400 in the electronic device 300 shown in FIG. 4 and a VSWR graph of an open loop antenna without a shielding member, the horizontal axis represents frequency (GHz) and the vertical axis represents VSWR. When the signal source excites the open loop antenna 400, the first radiating section 410 covers the first frequency $FB_1$ and the second frequency band $FB_2$, and the second radiating section 420 covers the third frequency band $FB_3$. As shown in FIG. 5A and FIG. 5B, the VSWR of the open loop antenna 400 having the shielding member 440 is similar to the VSWR of the open loop antenna without the shielding member, which means that the open loop antenna 400, when equipped with the shielding member 440, is able to maintain low reflection power and support broadband operation of the wireless local area network (WLAN) in 2.4 GHz, 5 GHz and the new generation WIFI 6E.

Figure 6A:
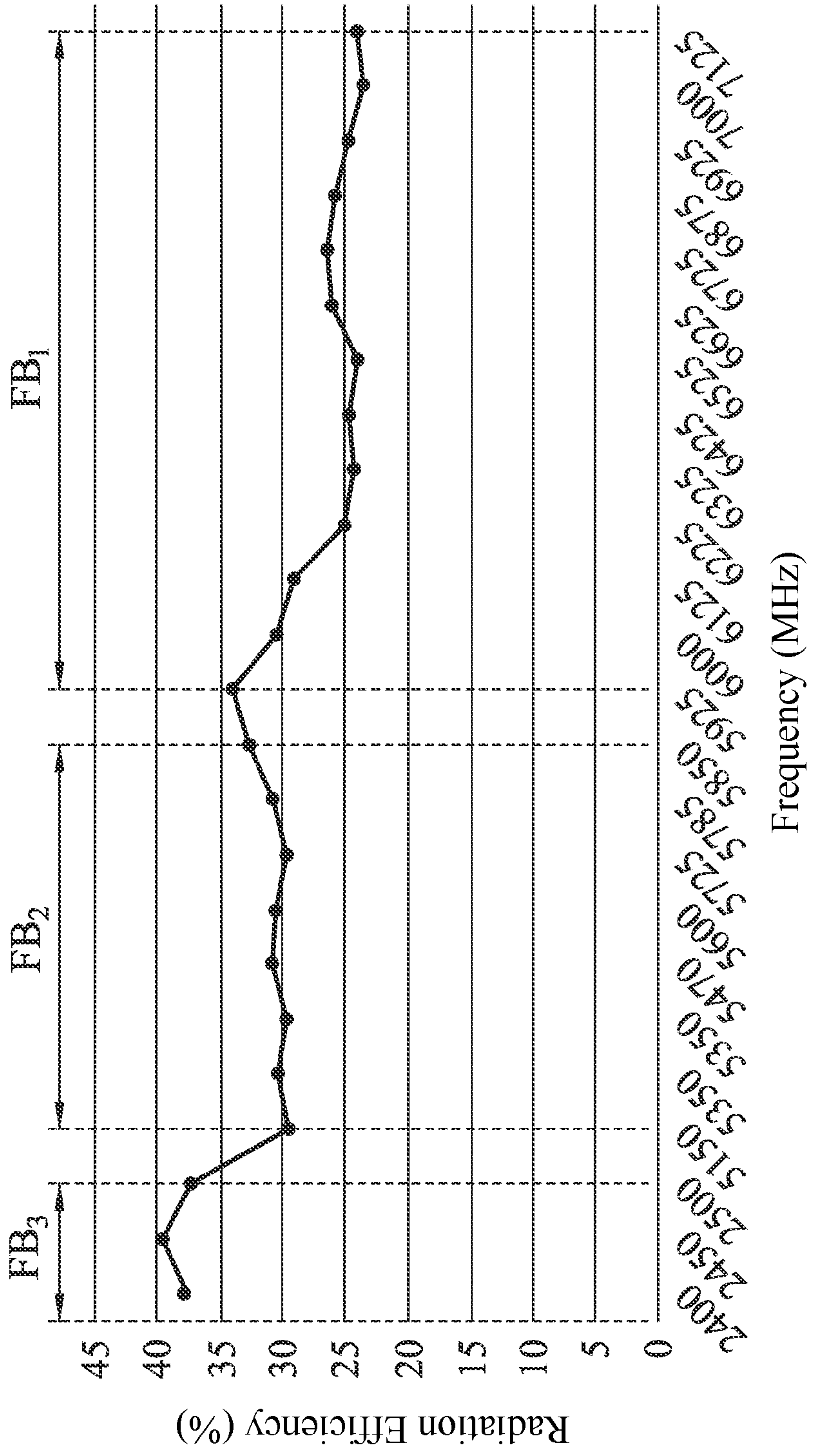
FIG. 6A is a schematic graph illustrating a radiation efficiency of the open slot antenna in the electronic device shown in FIG. 4.
Figure 6B:
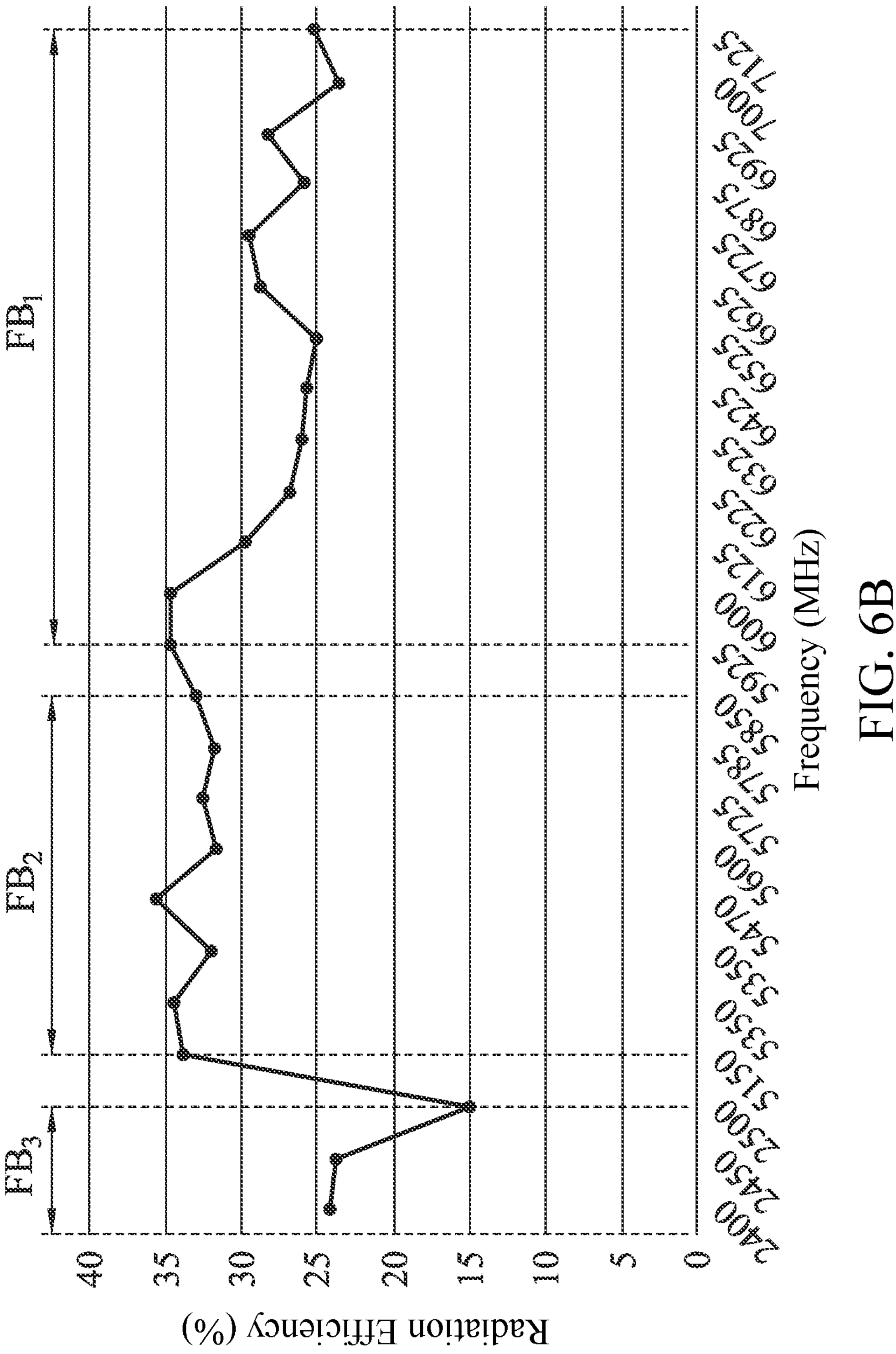
FIG. 6B is a schematic graph illustrating a radiation efficiency of an open slot antenna without a shielding member.

Referring to FIG. 6A and FIG. 6B, which respectively illustrate the radiation efficiency of the open loop antenna 400 in the electronic device 300 shown in FIG. 4 and the radiation efficiency of an open loop antenna without a shielding member, the horizontal axis represents frequency (MHz) and the vertical axis represents radiation efficiency (%). As shown in FIG. 6A and FIG. 6B, the radiation efficiency of the open loop antenna 400 with the shielding member 440 and the radiation efficiency of the open loop antenna without the shielding member in the first frequency band $FB_1$, the second frequency band $FB_2$, and the third frequency band $FB_3$ all reach 25% and above, which satisfies the actual usage needs of general mobile communication devices. It is to be noted that by isolating electromagnetic waves generated by other electronic modules with the shielding member 440, the open loop antenna 400 of the present disclosure is able to provide better radio frequency signal transmission in the third frequency band $FB_3$, and its radiation frequency can be as high as 40%.

In view of the above, the present disclosure has the following advantages. First, through the arrangement among the first radiating section, the second radiating section, and the grounding section, not only is the open loop antenna of the present disclosure miniaturized in size, but also supports the broadband operation in WLAN and WIFI 6E. Second, the open loop antenna of the present disclosure uses the shielding member to isolate the electromagnetic waves generated by nearby electronic modules and electric components, so that the first radiating section and the second radiating section are not interfered by noise interference, thereby enhancing stability and radiation frequency of the open loop antenna. Third, when the open loop antenna of the present disclosure operates in low frequency band, the antenna radiation efficiency is as high as 40%.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An open loop antenna comprising:

a base being an irregular three dimensional structure with a plurality of surfaces;

a first radiating section disposed on some of the surfaces of the base and comprising:

a feeding segment, wherein one end of the feeding segment is connected to a feeding point;

an extending segment connected to another end of the feeding segment, wherein the extending segment generates a first frequency band when being excited; and a high-frequency coupling segment connected to the extending segment, wherein the high-frequency coupling segment generates a second frequency band when being excited;

a second radiating section disposed on some of the surfaces of the base and spaced apart from the first radiating section to form an open loop, wherein the second radiating section is coupled with the first radiating section to generate a third frequency band; and a grounding section disposed on the base and spaced apart from the first radiating section, wherein the grounding section is connected to the second radiating section and a ground voltage;

a shielding member being a metal frame formed in correspondence to some of the surfaces of the base, and surrounding the first radiating section and the second radiating section to provide electromagnetic shielding for the first radiating section and the second radiating section to isolate an electromagnetic wave generated by at least one electronic module disposed around the first radiating section and the second radiating section;

wherein the first frequency band is higher than the second frequency band, and the second frequency band is higher than the third frequency band;

wherein a coupling gap is formed between the first radiating section and the second radiating section, and a total length of the first radiating section, the coupling gap and the second radiating section is one half of a wavelength of the third frequency band.

2. An open loop antenna comprising:

a base being an irregular three dimensional structure with a plurality of surfaces;

a first radiating section disposed on some of the surfaces of the base and comprising:

a feeding segment, wherein one end of the feeding segment is connected to a feeding point;

an extending segment connected to another end of the feeding segment, wherein the extending segment generates a first frequency band when being excited; and a high-frequency coupling segment connected to the extending segment, wherein the high-frequency coupling segment generates a second frequency band when being excited;

a second radiating section disposed on some of the surfaces of the base and spaced apart from the first radiating section to form an open loop, wherein the second radiating section is coupled with the first radiating section to generate a third frequency band; and a grounding section disposed on the base and spaced apart from the first radiating section, wherein the grounding section is connected to the second radiating section and a ground voltage;

a shielding member being a metal frame formed in correspondence to some of the surfaces of the base, coupled to the ground voltage and covering some of the surfaces of the base, wherein the shielding member surrounds the first radiating section and the second radiating section to provide electromagnetic shielding for the first radiating section and the second radiating section;

wherein the first frequency band is higher than the second frequency band, and the second frequency band is higher than the third frequency band;

wherein a coupling gap is formed between the first radiating section and the second radiating section, and a total length of the first radiating section, the coupling gap and the second radiating section is one half of a wavelength of the third frequency band.

3. The open loop antenna according to claim 1, further comprising:

a coaxial cable disposed on the base and comprising:

a central conductive line coupled to the feeding point; and a conductive housing coupled to a grounding point of the ground voltage.

4. The open loop antenna according to claim 1, wherein the feeding segment comprises:

a first feeding subsection extending from the feeding point along a first direction; and a second feeding subsection extending from the first feeding subsection along a second direction;

wherein the second direction is perpendicular to the first direction, and the first feeding subsection and the second feeding subsection form an L shape.

5. The open loop antenna according to claim 1, wherein the extending segment is rectangular and extends toward the second radiating section.

6. The open loop antenna according to claim 4, wherein the high-frequency coupling segment comprises:

a first high-frequency coupling subsection extending from the extending segment along the second direction;

a second high-frequency coupling subsection extending from the first high-frequency coupling subsection along a third direction, wherein the third direction is opposite the first direction; and a third high-frequency coupling subsection extending from the second high-frequency coupling subsection along a fourth direction, wherein the fourth direction is opposite the second direction;

wherein the first high-frequency coupling subsection, the second high-frequency coupling subsection, and the third high-frequency coupling subsection are connected to form a U shape.

7. The open loop antenna according to claim 6, wherein the second radiating section comprises:

a low-frequency coupling segment spaced apart from the high-frequency coupling segment along the third direction; and a grounding segment extending from the low-frequency coupling segment along the fourth direction.

8. The open loop antenna according to claim 7, wherein the low-frequency coupling segment comprises:

a first low-frequency coupling subsection spaced apart from the third high-frequency coupling subsection of the high-frequency coupling segment along the third direction and parallel to the third high-frequency coupling subsection;

a second low-frequency coupling subsection extending from the first low-frequency coupling subsection along the third direction; and a third low-frequency coupling subsection extending from the second low-frequency coupling subsection along the fourth direction;

wherein the first low-frequency coupling subsection, the second low-frequency coupling subsection, and the third low-frequency coupling subsection are connected to form a U shape.

9. The open loop antenna according to claim 8, wherein the grounding segment comprises:

a first grounding subsection extending from the third low-frequency coupling subsection along the fourth direction; and a second grounding subsection extending from the first grounding subsection along the first direction and connected to the grounding section;

wherein the first grounding subsection and the second grounding subsection form another L shape.

10. The open loop antenna according to claim 1, wherein the first frequency band is between 5925 MHz and 7125 MHz, the second frequency band is between 5150 MHz and 5850 MHZ, and the third frequency band is between 2400 MHz and 2500 MHz.

11. The open loop antenna according to claim 1, wherein the first radiating section has a length that is one quarter of a wavelength of the second frequency band.

12. The open loop antenna according to claim 1, wherein the coupling gap is 0.5 mm.

13. An electronic device comprising:

a housing;

an open loop antenna disposed in the housing and comprising:

a base being an irregular three dimensional structure with a plurality of surfaces;

a first radiating section disposed on some of the surfaces of the base and comprising:

a feeding segment, wherein one end of the feeding segment is connected to a feeding point;

an extending segment connected to another end of the feeding segment, wherein the extending segment generates a first frequency band when being excited; and a high-frequency coupling segment connected to the extending segment, wherein the high-frequency coupling segment generates a second frequency band when being excited;

a second radiating section disposed on some of the surfaces of the base and spaced apart from the first radiating section to form an open loop, wherein the second radiating section is coupled with the first radiating section to generate a third frequency band, the first frequency band is higher than the second frequency band, the second frequency band is higher than the third frequency band, a coupling gap is formed between the first radiating section and the second radiating section, and a total length of the first radiating section, the coupling gap and the second radiating section is one half of a wavelength of the third frequency band;

a grounding section disposed on the base and spaced apart from the first radiating section, wherein the grounding section is connected to the second radiating section and a ground voltage;

a coaxial cable disposed on the base and comprising:

a central conductive line coupled to the feeding point; and a conductive housing coupled to a grounding point of the ground voltage; and a shielding member being a metal frame formed in correspondence to some of the surfaces of the base, coupled to the ground voltage and covering some of the surfaces of the base, wherein the shielding member surrounds the first radiating section and the second radiating section to provide electromagnetic shielding for the first radiating section and the second radiating section; and at least one electronic module disposed in the housing and around the open loop antenna.

14. The electronic device according to claim 13, wherein the housing comprises an antenna window, and the first radiating section and the second radiating section are aligned with the antenna window.

15. The electronic device according to claim 13, wherein the feeding segment comprises:

a first feeding subsection extending from the feeding point along a first direction; and a second feeding subsection extending from the first feeding subsection along a second direction;

wherein the second direction is perpendicular to the first direction, and the first feeding subsection and the second feeding subsection form an L shape.

16. The electronic device according to claim 13, wherein the extending segment is rectangular and extends toward the second radiating section.

17. The electronic device according to claim 15, wherein the high-frequency coupling segment comprises:

a first high-frequency coupling subsection extending from the extending segment along the second direction;

a second high-frequency coupling subsection extending form the first high-frequency coupling subsection along a third direction, wherein the third direction is opposite the first direction; and a third high-frequency coupling subsection extending from the second high-frequency coupling subsection along a fourth direction, wherein the fourth direction is opposite the second direction;

wherein the first high-frequency coupling subsection, the second high-frequency coupling subsection, and the third high-frequency coupling subsection are connected to form a U shape.

18. The electronic device according to claim 17, wherein the second radiating section comprises:

a low-frequency coupling segment spaced apart from the high-frequency coupling segment along the third direction; and a grounding segment extending from the low-frequency coupling segment along the fourth direction.

19. The electronic device according to claim 18, wherein, the low-frequency coupling segment comprises:

a first low-frequency coupling subsection spaced apart from the third high-frequency coupling subsection of the high-frequency coupling segment along the third direction and parallel to the third high-frequency coupling subsection;

a second low-frequency coupling subsection extending from the first low-frequency coupling subsection along the third direction; and a third low-frequency coupling subsection extending from the second low-frequency coupling subsection along the fourth direction;

wherein the first low-frequency coupling subsection, the second low-frequency coupling subsection, and the third low-frequency coupling subsection are connected to form another U shape; and the grounding segment comprises:

a first grounding subsection extending from the third low-frequency coupling subsection along the fourth direction; and a second grounding subsection extending from the first grounding subsection along the first direction and connected to the grounding section;

wherein the first grounding subsection and the second grounding subsection form another L shape.

* * * * *